United States Patent
Yang (10) Patent No.: US 8,166,203 B1
(45) Date of Patent: Apr. 24, 2012

(54) SERVER SELECTION BASED UPON TIME AND QUERY DEPENDENT HASHING

(75) Inventor: Don Hsi-Yun Yang, Milpitas, CA (US)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 12/474,406

(22) Filed: May 29, 2009

(51) Int. Cl.
*G06F 15/16* (2006.01)

(52) U.S. Cl. ........ 709/246; 709/223; 709/225; 709/229; 709/217; 709/219; 707/698; 707/747; 707/756; 707/760; 713/189; 705/1

(58) Field of Classification Search .................. 709/225, 709/223, 229, 224, 217, 219, 246; 713/189; 705/1
See application file for complete search history.

(56) References Cited

U.S. PATENT DOCUMENTS

| | | | |
|---|---|---|---|
| 2002/0105907 A1* | 8/2002 | Bruekers et al. | 370/229 |
| 2004/0205056 A1* | 10/2004 | Mori et al. | 707/3 |
| 2005/0038890 A1* | 2/2005 | Masuda et al. | 709/224 |
| 2005/0149520 A1* | 7/2005 | De Vries | 707/5 |
| 2005/0198333 A1* | 9/2005 | Dinges et al. | 709/229 |
| 2006/0248195 A1* | 11/2006 | Toumura et al. | 709/226 |
| 2007/0050491 A1* | 3/2007 | Kataoka et al. | 709/223 |
| 2007/0106908 A1* | 5/2007 | Miyazaki et al. | 713/189 |
| 2008/0059211 A1* | 3/2008 | Brock et al. | 705/1 |
| 2009/0034714 A9* | 2/2009 | Boneh et al. | 380/28 |

* cited by examiner

*Primary Examiner* — Thuong Nguyen
(74) *Attorney, Agent, or Firm* — Fish & Richardson P.C.

(57) ABSTRACT

In general, the subject matter described in this specification can be embodied in methods, systems, and program products for selecting a server from a plurality of servers to process a query. A query is converted into a query number. A hashing operation is performed on a combination of the query number and a second number that is associated with a present time interval. The hashing operation generates a hash value associated with the query and the present time interval. A length of the present time interval is increased as a quantity of servers in a plurality of servers increases. A server in the plurality of servers is selected to process the query, based on the hash value. The query is sent to the selected server.

8 Claims, 5 Drawing Sheets

SERVER SELECTION BASED UPON TIME AND QUERY DEPENDENT HASHING

BACKGROUND

Servers receive various kinds of queries and typically forward them to other servers for processing results responsive to the query. For example, individuals accessing the Internet with computing devices may submit queries to search engines or other services that search databases and provide relevant results to the queries. A single search service can require numerous networked servers to handle all the queries received from computing devices. A query transmitted to such a search service may be received by a front-end server that does not immediately return results to the query but instead forwards the query to another server, sometimes called a back-end server, for identification of results that are responsive to the query. Numerous back-end servers can exist and the front-end server can distribute queries among the backend servers to ensure that work is evenly distributed.

Back-end servers, upon receiving queries from front-end servers, can access one or more datastores that include information potentially relevant to the query. The back-end server, or other computing devices in communication with the back-end server, sort through the information to determine specific entries that are responsive to the query. The responsive entries (i.e., the search results) are returned to the querying computing device for presentation to an individual that submit the query. A back-end server may be capable of storing a copy of the search results relevant to the query (sometimes called a cache). Upon receiving an identical query, the back-end server could return a cached result instead of accessing the datastore in order to save time and computer resources.

SUMMARY

This specification describes technologies relating to the selection of servers to process queries. In general, one aspect of the subject matter described in this specification can be embodied in a method for selecting a server from a plurality of servers to process a query. A query is converted into a query number. A hashing operation is performed on a combination of the query number and a second number that is associated with a present time interval. The hashing operation generates a hash value associated with the query and the present time interval. A length of the present time interval is increased as a quantity of servers in a plurality of servers increases. A server in the plurality of servers is selected to process the query, based on the hash value. The query is then sent to the selected server.

Another aspect of the subject matter described in this specification can be embodied in another method for selecting a server from a plurality of servers to process a query. A length for a present time interval based upon an output of a first random number generator is defined. A random seed for the present time interval based upon an output of a second random number generator is defined. The query is converted into a query number and a hashing operation is performed on a combination of the query number and the random seed. The hashing operation generates a hash value associated with the query and the present time interval. A server is selected from a plurality of servers to process the query, based on the hash value. The query is sent to the selected server. Other embodiments of these aspects include corresponding systems and computer program products.

These and other embodiments can optionally include one or more of the following features. The second number associated with the present time interval can be modified at an expiration of the present time interval. The second number can be based upon a time-stamp of a computing device and determined by multiplying the time-stamp by the quantity of servers and dividing the product by a present time interval length. The selected server may include a cache of results responsive to the query. The cache can be created from an identical query previously received within the present time interval. The time interval length may be re-defined as another output of the first random number generator and the random seed may be re-defined as another output of the second random number generator upon an expiration of the present time interval. The query conversion can be from the alpha-numeric representation of the query to an underlying binary or hexadecimal numerical representation of the alpha numeric query. The selected server can processes a plurality of queries and include a cache of results for a subset of the plurality of queries. The subset of the plurality of queries can be determined based upon a popularity of queries in the subset.

Particular aspects of the subject matter described in this specification can be implemented to realize one or more of the following advantages. A server may be selected from a larger group of servers to repeatedly process a specific query, permitting the selected server to cache results to the query in addition to returning them to a requesting device. Upon subsequently receiving another instance of the specific query, the selected server can return the previously cached results instead of repeatedly accessing a datastore. Returning cached results instead of accessing a datastore can involve fewer computing devices, resulting in a faster response to the query and requiring less electricity. Because the datastore is accessed less frequently, the datastore may include fewer computing devices (if a networked group of servers or databases) and include slower (i.e., cheaper) devices. Additionally, back-end servers may not require as much time to process queries and thus may handle more queries per server. Fewer back-end servers may be required.

Additional advantages include modifying query routing so that a particular server only processes a particular query for a determined time period. Alternating which servers process particular queries mitigates against third-parties identifying numerous queries that are handled by a single server, permitting attacks on specific servers by overloading the servers with a substantial volume of queries.

The details of one or more implementations of the invention are set forth in the accompanying drawings and the description below. Other features, aspects, and advantages of the invention will become apparent from the description, the drawings, and the claims.

DESCRIPTION OF DRAWINGS

Like reference symbols in the various drawings indicate like elements.

DETAILED DESCRIPTION

Figure 1:
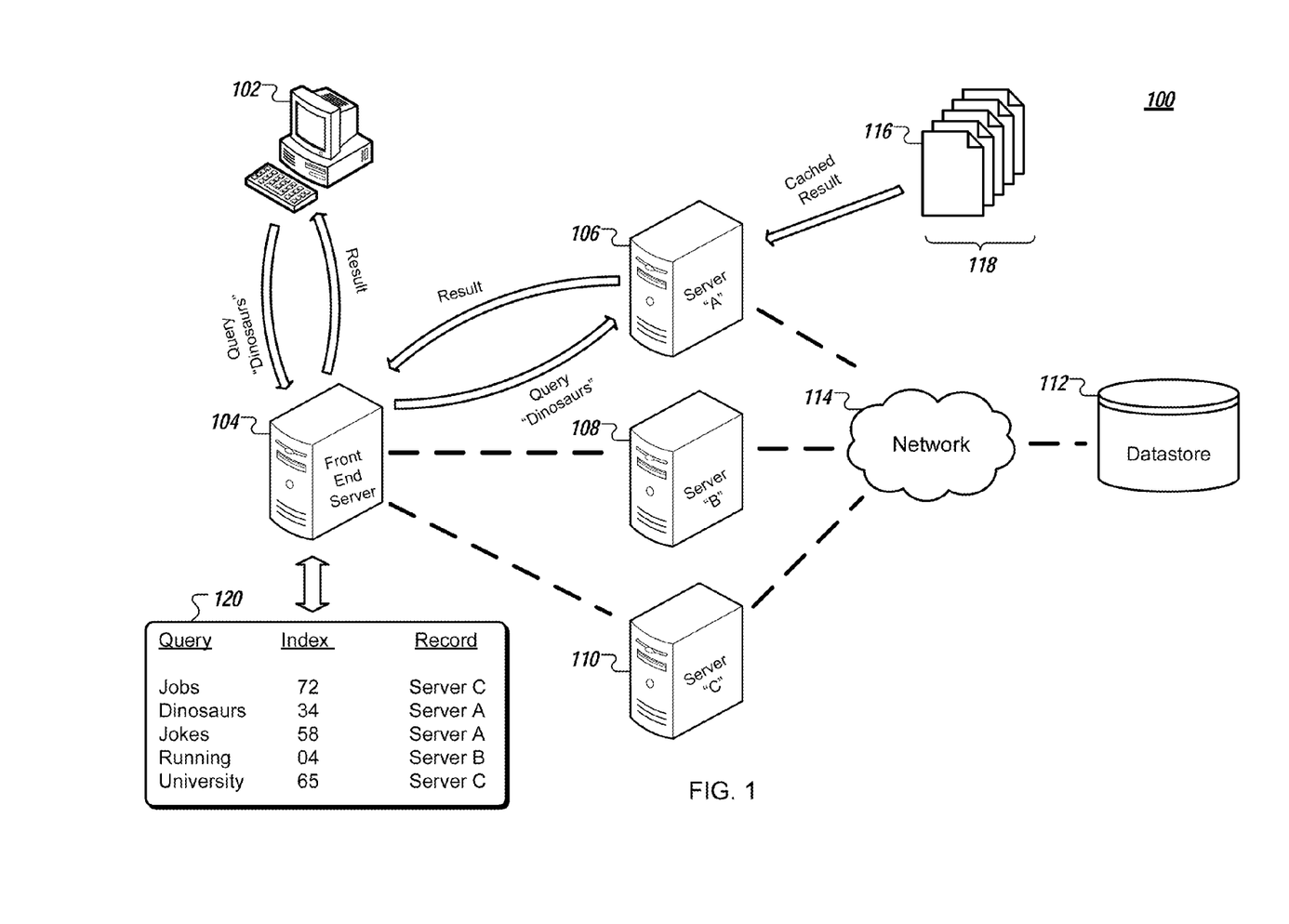
FIG. 1 illustrates an example system for determining servers to process queries sent from remote machines.

FIG. 1 illustrates an example system 100 for determining a server to process a query. Front-end server 104 receives a query from computing device 102 and, based upon a record in hash table 120 that is associated with the particular query, selects server 106 from the plurality of servers 106, 108, and 110 to process the query. Server 106 may process the query by either accessing datastore 112 connected through network 114 or by returning a previously cached result 116 for the query, for example.

In some implementations, front-end server 104 supplies computing device 102 with a graphical user interface to a general content search engine. A user of computing device 102 can use the search engine interface to enter a query and retrieve relevant results in response and provided by the search engine. For example, the user can enter the query "Dinosaurs" and the computing device 102 will transmit the query to server 104 for processing. Computing device 102 is shown as a desktop computer but can be a wide range of computing devices, for example, a laptop or a mobile phone. Computing device 102 can also include computing devices that do not provide a user interface but instead generate queries internally or receive user specified queries from other computing devices. The transmitted query can be in the form of text, voice, or an image, for instance. Numerous computing devices similar to computing device 102 may transmit queries to server 104 and receive results responsive thereto.

Server 104 receives queries and distributes them among a plurality of servers 106, 108, and 110. In various examples, server 104 cannot process all the queries received by computing devices such as computing device 102 and instead routes the received queries. In some examples, the server 104 modifies the received query before sending the query to another server for additional processing (e.g., the query can be modified from "Dinosaurs" to "dinosaurs OR dinosaur"). Servers such as 104 that receive queries and transmit them to other servers are sometimes called front-end servers. Servers 106, 108, and 110 are sometimes called back-end servers.

By way of illustration, front-end server 104 selects back-end server 106 for additional query processing based upon the use of hash table 120. Hash table 120 is a data structure accessed by a hash function or hashing operation to provide a record (also called a value) based on a key. The record can be identified by an index number (e.g., an index to an array of values that stores the records). Server 104 utilizes a hashing function to associate a query (the key) with a particular server (the record). In some implementations, the key is not a query by itself, but a combination of the query and a number that is unique to the present time period.

In various implementations, hash table 120 serves to divide a number of queries among the back-end servers. For example, in FIG. 1 "Server A" 106 will process all "Dinosaurs" and "Jokes" queries. Servers "B" and "C" do not process these queries, but instead process queries for "Running," "Jobs," and "University." Back-end servers 106, 108, and 110 are all networked to server 106 and able to receive and process queries transmitted by server 104. Because "Server A" 106 is associated with the query "Dinosaurs," server 104 transmits the query to back-end server 106. Additional details regarding the operation of the hash function and table are discussed with regard to FIGS. 3-5 below.

Back-end server 106 is connected through network 114 to datastore 112. In some implementations, datastore 112 includes an index of documents and records that may be searched to determine appropriate results to a query. For example, datastore 112 may include indexed representations of web pages and other resources obtained from the Internet. Server A may determine which of these representations is most relevant to the "Dinosaurs" query based upon a prevalence of the search term in the documents, for example. In some implementations, datastore 112 is representative of a collection of databases or servers that are connected to databases. Datastore 112 can include a single database or a single file. In various implementations, datastore 112 is shared among servers 106, 108, and 110. In other implementations, each of servers 106, 108, and 110 includes a copy of datastore 112. Datastore 112 may include information specific to an intranet or company database.

Server 106 includes one or more caches 118 that are associated with specific queries. These caches serve as temporary storage areas where results to queries can be stored for rapid access. The use of the caches 118 allows server 106 to avoid recomputing responses to identical or similar queries. For example, cache 116 includes information enabling server 106 respond to the query "Dinosaurs" without accessing datastore 112. Cache 116 may only include a partial response to the query "Dinosaurs." For example, if ten million results were identified in datastore 112 for the query "Dinosaurs," cache 116 may store the 100 most relevant of these results. Server 106 may return 20 of the results as responsive to the query. If a request for additional results is received by server 106, an additional twenty results are provided from the cache.

For security purposes discussed in more detail later, in some implementations, caches 118 can be cleared upon the expiration of a time period. In some implementations, a cache (e.g., 116) is filled upon server 106 accessing datastore 112 to compute a response to a query that does not have an associated cache. In other implementations, cache 116 is not filled until a query has been computed by server 106 a certain number of times during a specific time period (e.g., more than once). Such minimum querying requirement ensures that the limited number of caches 118 are filled with information relevant to the most popular queries. Similarly, caches 118 may be filled with information in response to a first query, but may be replaced if subsequent queries are received that are more popular.

In some implementations, a cache (e.g., 116) includes information sufficient for server 106 to respond to a query. For example, the cache may include links to various web pages responsive to the query, sizes of the web pages, dates the web pages were last updated, and portions of text or images from the web pages. In other implementations, a cache (e.g., 116) includes additional information to facilitate a selection by server 106 of a subset of results from the cache. For example, cache 116 may identify the number of times users have selected the cached search results as a response to the query, or the last time each cached search result was generated from a resource.

Continuing with the illustrative example, the back-end server 106, upon receiving the query "Dinosaurs" from front-end server 104 determines if a cache specific to the query is present among caches 118. If so, information from the particular cache is transmitted to server 106. If a cache specific to "Dinosaurs" is unavailable, server 106 computes a response to the query by accessing datastore 112. The computed response can be stored within one of caches 118 to facilitate quicker access upon a subsequent "Dinosaurs" query.

In some implementations, server 104, upon receiving the response from server 106, transmits the response to computing device 102. Computing device 102 can present the received search results to a user of the computing device, for example, by displaying the results on a display device, transmitting sound corresponding to the results, or providing haptic feedback corresponding to the results. In other implementations, server 106 transmits the results not to server 104, but to another server or directly to computing device 102.

Figure 2:
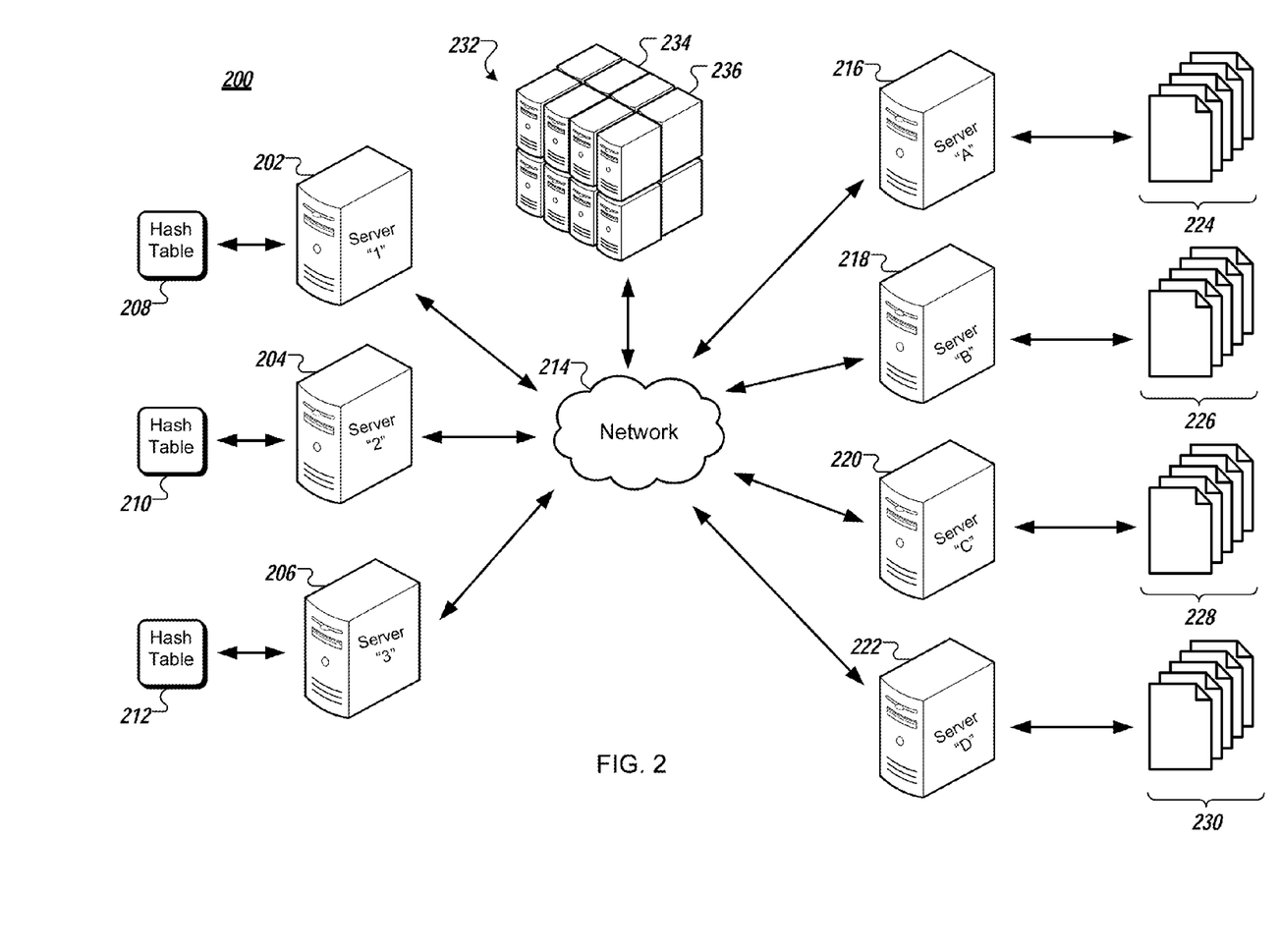
FIG. 2 illustrates an example system for coordinating multiple servers' selection of servers to process queries.

FIG. 2 illustrates an example system 200 for coordinating multiple servers' selection of other servers to process queries. Displaying additional front-end servers better illustrates the coordination between these servers in their selection of back-end servers 216, 218, 220, and 222. Servers 216, 218, 220, and 222 are respectively associated with caches 224, 226, 228, and 230 that include information relevant to queries.

In some implementations, servers 202, 204, and 206 function as front-end servers for processing a query from computing devices. A front-end server (e.g., 202, 204, or 206) that receives a query transmitted by a computing device can be selected based upon geographical proximity to the computing device, an availability or processing capacity of the front-end server, or appropriateness to a particular query (e.g., simple queries or image queries may be handled by server 202 while complex queries or video queries may be handled by server 204). Each server 202, 204, and 206 accesses a hash table 208, 210, and 212 to select a back-end server 216, 218, 220, or 222 to process a particular query. The hash tables can be stored locally on each server 202, 204, and 206 and updated synchronously. In other examples, all front-end servers access another server (not shown) that manages a central hash table.

As an illustration, server 202 may receive the query "Jobs" from a computing device. Hash table 208 is used to select the query "Jobs" as handled by "Server C" 220. Server 220 either retrieves search results to the "Jobs" query from caches 228 or accesses the bank of servers 232 and computes search results to the "Jobs" query. Server 220 transmits the appropriate results either directly back to the querying computing device or back to server 202 for forwarding to the querying computing device.

In other implementations, the query does not originate with a computing device but originates from one of servers 202, 204, or 206. As an example, a server (e.g., 202, 204, or 206) can periodically request the health or status of particular servers in the bank 232. Server 202 may need to know if a hard drive is working for server 234, how busy server 236 is, the temperature of server 234, etc. If servers 204 and 206 request similar information, the servers in bank 232 are burdened by computing responses repeatedly. To avoid duplication, identical queries from servers 202, 204, and 206 that are directed to a single server in bank 232 are routed through a single server among 206, 218, 220, and 222.

For example, servers 202, 204, and 206 request the temperature of server 234 by transmitting an appropriate query to server 216. In contrast, servers 202, 204, and 206 request how busy server 236 is by transmitting an appropriate query to server 200. Servers 216 and 220 cache the status of servers 234 and 236, permitting servers 234 and 236 to avoid responding to duplicative queries. Servers 216 and 220 periodically update caches 224 and 228. The coordination of servers 202, 204, and 206 in their selection of servers 216, 218, 220, and 222 is realized by using hash tables 208, 210, and 212. The benefits from the above described arrangement are most notably realized when the number of servers in the server bank 232 significantly exceeds the number of servers 216, 218, 220, and 222.

Figure 3:
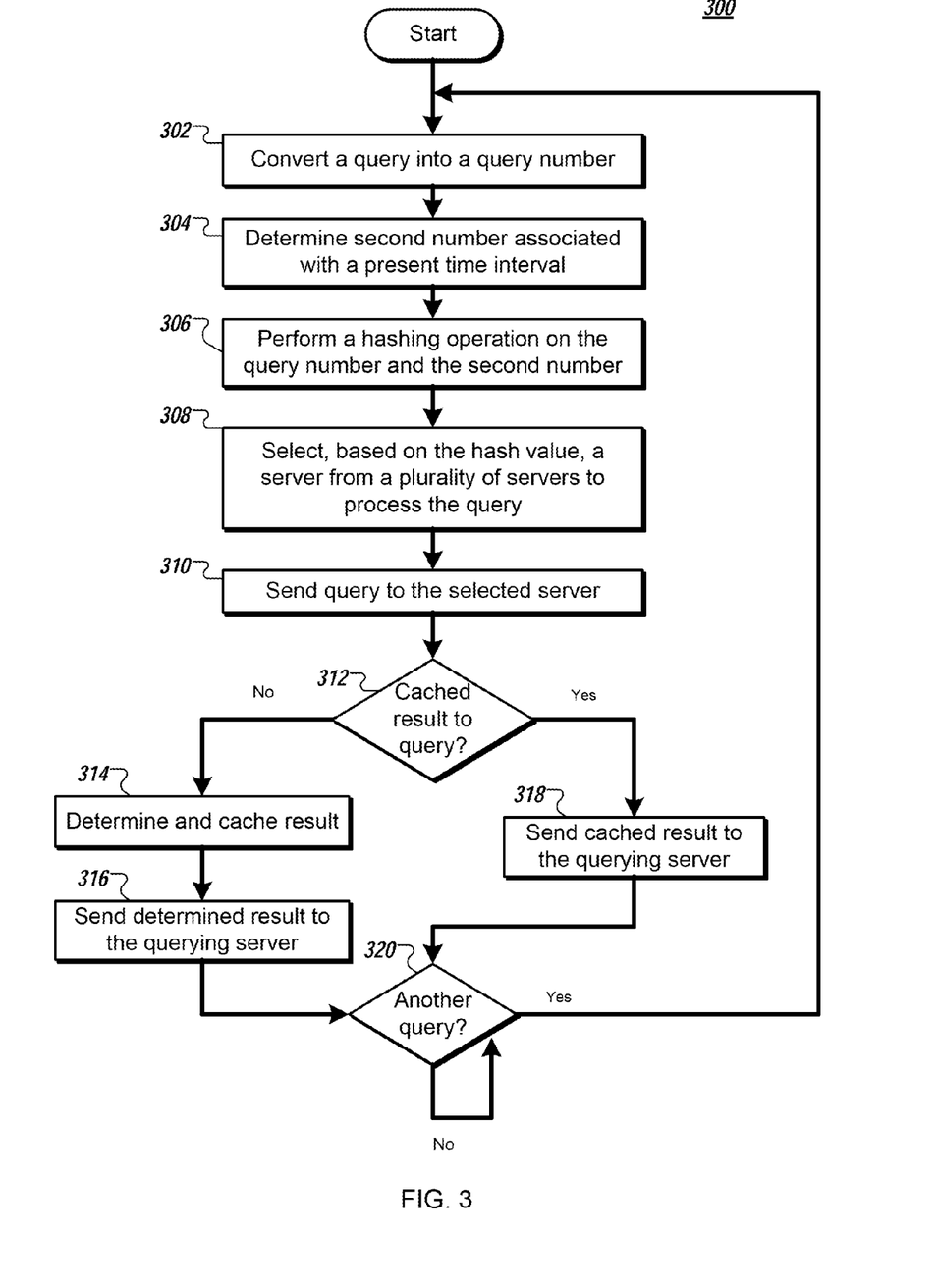
FIG. 3 illustrates a flow chart of an example process for determining servers to process queries.

FIG. 3 illustrates a flow chart of an example process 300 for selecting a server for processing of a query. The example process may be performed, for example, by systems 100, 200 and 500 described in connection with the other figures. Another system or combination of systems, however, may be used to perform process 300.

In step 302, a query is converted into a query number to facilitate processing of the query by a hash function. In various implementations, the described query is received by a front-end server (e.g., 104). The server may perform the conversion itself or request that a different computing device perform the conversion. For example, a simple text to ASCII (Decimal) conversion by server 104 replaces "Dinosaurs" with "68105110111111597117114115." Conversion into other numerical representations for characters such as ASCII (Hex), EBCDIC, and Unicode is contemplated. Other techniques for converting text to a number are possible. In some implementations, conversion is unnecessary where the system only utilizes the underlying numerical representation of the alpha-numeric query (i.e., the binary or hexadecimal number recognized by computing devices) and does not further modify this underlying numerical representation.

Query conversions that do not include known coding standards such as ASCII can limit the length of query numbers or increase security. For example, the query conversion can limit the query number to a length that does not exceed the bounds acceptable for input into a hash function (e.g., 8 digits). Additionally, conversion into a non-standard number decreases the chance that a third-party can cause malicious and excessive hash collisions.

In step 304, a second number that is associated with a present time interval is determined. In some implementations, the second number is obtained from a time stamp of a server (e.g., server 104 or 202). For example, a time stamp expressed in seconds can be divided by a time interval length. The quotient may be rounded to the nearest whole integer to provide a second number that changes every N seconds, where N is the time interval length.

In some implementations, the second number is modified based upon a number of back-end servers. For example, the above described quotient can be multiplied by a number of back-end servers. This operation increases the length of time before the second number changes, effectively increasing the length of the time period. An increase in the amount of back-end servers can indicate a decrease in the number of queries that each server handles. This decrease reduces the vulnerability of back-end servers to excessive, deliberate, and malicious queries by third parties, permitting a longer time period of association between a particular query and a server. In other implementations, the above described quotient is multiplied by a number that is derived from or associated with the number of back-end servers, but does not actually represent that number.

Equation 1 is an example equation for determining a number associated with a present time interval utilizing a time stamp.

$$\text{Quantize\_time(timestamp\_in\_seconds, time\_period, backend\_number)} = \text{floor(timestamp\_in\_seconds} / \text{time\_period} * \text{backend\_number)} \quad \text{(Eq. 1)}$$

In this example, the "floor" operation effectively rounds down the result of the division and multiplication to the next integer. In some implementations, the time period is static (e.g., 300 seconds). In other implementations, the time period is changed occasionally or is a random number that is re-determined upon the expiration of every time period. In some implementations, the second number need not be modified based upon the number of back-end servers available. For example, Equation 1 may include no reference to "backend_number."

In step 306, a hashing operation is performed on a combination of the query number and the second number associated with a present time interval. The result of the hashing operation determines a hash value. As an illustration, if the query "Dinosaurs" is converted into the number 68105110111111597117114115 and the second number is 2349827395, one combination of the two numbers is 68105110111115994669415 10 (i.e., the two numbers added together). Other combinations of the two numbers may be used as well (e.g., multiplication, division, subtraction). In some implementations, the hashing operation converts the combined number into an index (i.e., a hash value, hash code, hash sum, or hash) to an array (i.e., a hash table).

As one example, the hashing operation includes a modulo operation (i.e., an operation that finds the remainder of a division of one number by another), specifically the "combined number" mod "number of back-end servers." Such operation ensures that a numerical result of the hashing operation (the index) does not exceed the number of back-end servers. Each back-end server is selected based upon a record associated with the index number. In other implementations, the hash operation directly yields an index number and a modulo operation is unnecessary. In various implementations, a hash function internally performs the query conversion and determines the second number. Various substitutions in order and of mathematical and computational processing are readily implemented and recognized by those skilled in the art.

Equation 2 is an example of a hash function that utilizes the quantize_time function of Equation 1.

$$\text{select\_server(query,timestamp\_in\_seconds,time period,backend\_number)=hash(query+quantize\_time(timestamp\_in\_seconds,time\_period,back-end\_number)) \% number\_of\_servers} \quad \text{(Eq. 2)}$$

In step 308, a server is selected to process the query using the hash value determined by the operation of step 306. In some implementations, the hash value is an index to a hash table or array that identifies all back-end servers. For example, the hash value may identify a specific record that includes a back-end server name, IP address, or calling function. For example, and with reference to FIG. 1, for the query "Dinosaurs" a hashing operation calculates a hash value of 34 that is associated with a record identifying "Server A" 106 as the server that should process the query "Dinosaurs."

In step 310, the query is transmitted to the selected server for processing. For example, the query for "Dinosaurs" is transmitted to Server A 106. The transmitted query may be modified by a server prior to receipt by the back-end server.

In step 312, the selected server determines if a local cache includes search results relevant to the received query. For example, server 106 of FIG. 1 receives the query "Dinosaurs" and may determine that cached result 116 permits information sufficient to respond without accessing datastore 112. If a cached result is available, the operation of step 318 is performed. If no cached result is available, the operation of step 314 is performed.

In step 318, the cached result, or a portion thereof, is transmitted to the querying server. For example, "Server A" 106 may return cached result 116 to server 104. In other implementations, server 106 may return cached result 116 to another front-end server that handles outgoing communication to computing device 102. Server 106 can also communicate the results directly to computing device 102.

In step 314, a result to a specific query is computed and cached. For example, if none of caches 118 include search results for the query "Dinosaurs," server 106 accesses datastore 112 and computes search results responsive to the received query. The computed search results are cached to facilitate access upon a subsequent, similar query. The information cached may include information in addition to that required to respond the particular query. In this manner, server 106 may utilize the cache 116 for queries that are similar to "Dinosaurs," but not identical. Server 106 may access cache 116 for subsequent results to a single query (e.g., results 21-40 to the query "Dinosaurs").

In step 316, at least some of the computed results from the operation of step 314 are transmitted either to a front-end server or to the querying device directly.

In step 320, a determination is made whether another query is received for process 300 to handle and route to an appropriate server. If no other query is received process 300 waits until another query is received. If a query is received, the operation of step 302 is performed.

Figure 4:
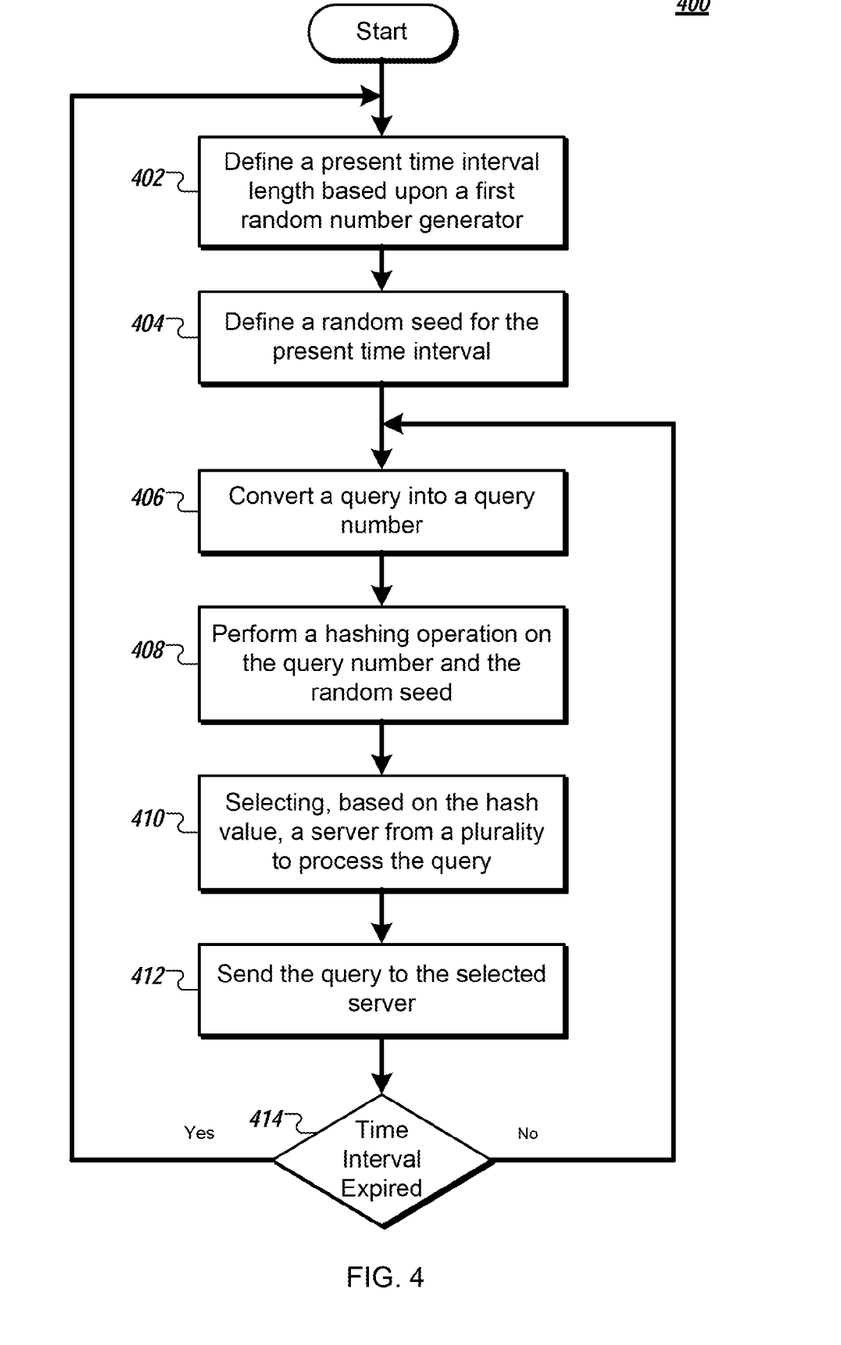
FIG. 4 illustrates a flow chart of an example process for determining servers to process queries.

FIG. 4 illustrates a flow chart of an example process 400 for determining a server to process a query. Like FIG. 3, the process can be performed by systems 100, 200, and 500. For exemplary purposes, system 200 is used to illustrate process 400. Any of servers 202, 204, and 206 alone, or in combination with other servers can perform process 400. In some implementations, a centralized server that is networked to servers 202, 204, and 206 performs at least some of the operations of steps 402-412. Another system or combination of systems, however, may be used to perform process 400.

In step 402, a present time interval length is determined based upon output from a random number generator. The determination of the time interval length is performed at the onset of the present time interval or at the expiration of a prior time interval. In some implementations, the time interval length influences how often servers' caches 224, 226, 228, and 230 are cleared or how often queries are re-assigned from one server to another. The time generator can be configured to output a number between a minimum and a maximum time interval length. For example, to ensure a maximum time interval a modulo operation may be performed on the random number generator output. An offset to the result of the modulo operation may be added to ensure the minimum time interval length.

In step 404, a random seed for the present time interval is determined. For example, a number that is different than the present time interval length may be obtained from the same number generator or a different random number generator. If the same random number generator is utilized, the minimum and maximum attributes may be modified for determining the random seed.

In step 406, a query is converted into a query number. As discussed in relation to the operation of step 302, this step may be inherently performed by the system if a query is in a format already recognizable as a number. A non-standard conversion (e.g., converting a query to a number that is not ASCII, EBCDIC, or Unicode) can decrease the potential for third-party users to identify a number associated with a particular query and cause malicious attacks such as intentional hash collisions (as discussed below).

In step 408, a hashing operation is performed on a combination of the query number and the random seed. In some implementations, the operation of step 408 is similar to that of step 306, with the distinction that the second number is random instead of determined from a timestamp, as in some implementations of process 300. The use of the random seed allows the hash value for a query to change between time periods. This periodic modification of a second number that is combined with a query helps protect against malicious attacks by third parties. For example, if the hashing operation was not time period dependent (i.e., if the same servers always processed a particular query), the queries unique to a particular server may be identifiable. Such identification permits overloading the particular server with queries. Additionally, periodically changing the queries that servers process helps ensure that servers overwhelmed with popular queries obtain relief upon expiration of the time interval. In various implementations, process 400 can combine the query number with a second number that is determined from a time stamp.

In step 410, a server from a plurality of servers is selected based upon the hash value. For example, the hash table 208 of server 202 may identify server 218 as associated with a particular query.

In step 412, a query is sent to the selected server for processing. The query sent to the server can be different than the original query. For example, server 202 may change the query "Dinosaurs" to "Dinosaurs OR Dinosaur." In some implementations, the query is modified prior to its input into the hashing operation.

In step 414, a determination is made whether the present time interval has expired. If not, the operation of step 406 is performed for subsequently received queries. If the present time interval has expired, the operation of step 402 is performed and a new present time interval length and a new random seed are defined. As an illustration, if process 300 defined the present time interval length as 15 seconds and the random seed as 7, the hashing operation would combine each query with the number 7 for 15 seconds. After 15 seconds has expired, the time interval length is re-defined (e.g., the new time interval length is 9 seconds) and a new random seed is re-defined (e.g., the new seed is 27). The result of this change is that different servers are selected to handle queries. In some implementations caches (e.g., caches 224, 226, 228, and 230) are cleared or flagged to be overwritten by new entries upon a time period's expiration.

Equation 3 is an example of pseudocode for an implementation of process 300.

Initialize Function:

random_time_interval=rand( )           (Eq. 3)

random_seed=rand( )

Select Backend Function:

return hash(query+seed)

while(frontend server is available) Select backend server and forward queries Call Initialize( ) after random_time_interval seconds In various implementations, processes 300 and 400 are modified to associate sub-sets of queries (as opposed to all the queries) with different servers upon the expiration of a time period. This "staggering" approach allows datastore 112 or bank of servers 232 to not be suddenly overwhelmed by all back-end servers 106, 108, and 110 or 216, 218, 220, and 222 accessing datastore 112 or bank 232 at the same time because caches no longer include results to received queries. In one implementation, staggering is implemented by dividing received queries between several functions (e.g., the functions of processes 300 or 400). Each function's time interval begins at a different time. As a simple example including four functions, queries with a first letter of a-f may be directed to the first function, queries with a first letter of h-m may be directed to the second function, etc.

In some implementations, the hash function may not combine a query with a second number. Instead, the process may periodically switch records in a hash table that is used for selecting servers to handle queries. The periodic switching may occur upon the expiration of a time interval, as determined above. All hash table records may be modified at the same time, or only a sub-set of the records may be modified. The switching of records can include a random assignment, a rotation, or alternate forms of swapping.

In other implementations, the hash function combines a query with a second number that is not defined by the processes described above, but is otherwise time-period dependent. The hashing of a time-dependent number in combination with a query, or the periodic modification of hash function records, establishes a time-dependent hashing operation that can be used to select a server from a plurality to handle queries.

Figure 5:
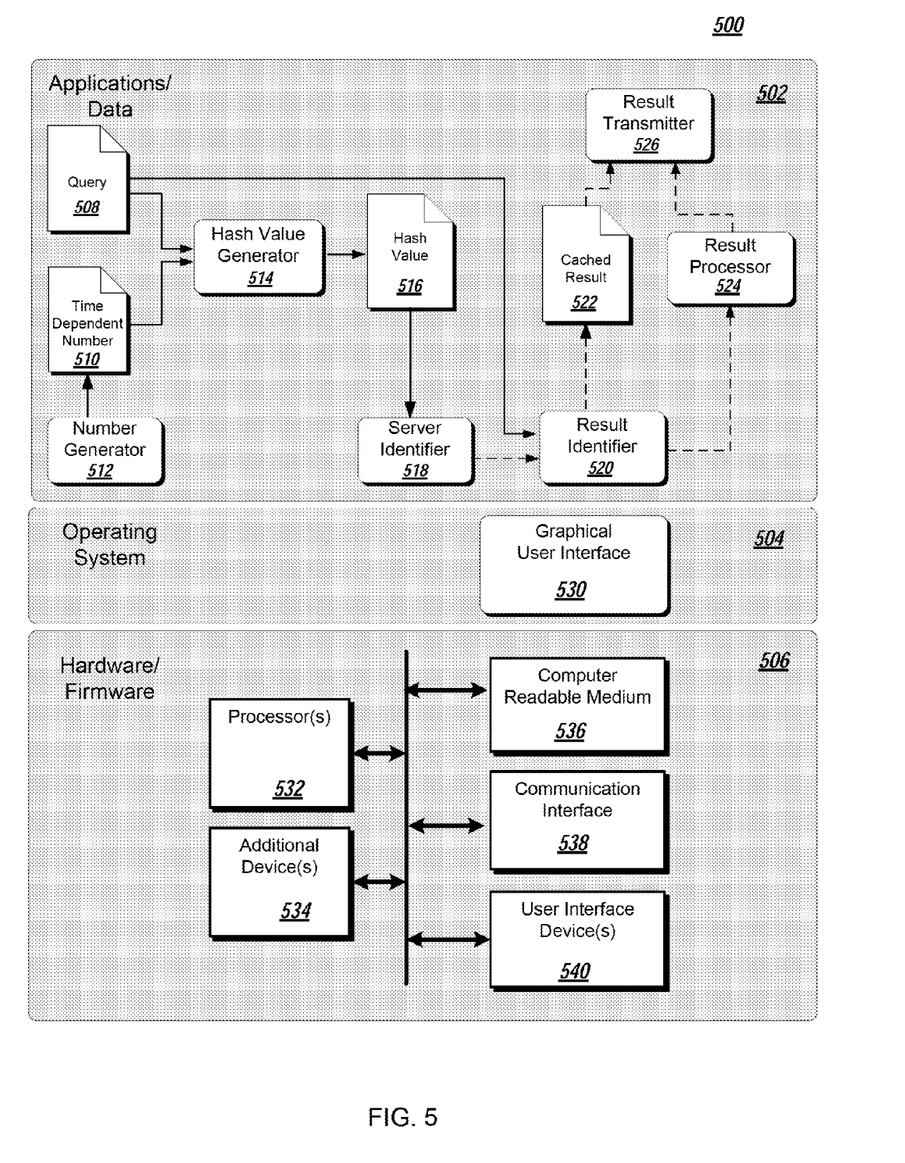
FIG. 5 illustrates an example architecture of a system for determining servers to process queries.

FIG. 5 illustrates an example architecture of a software system 500 for selecting a server to process a query. A hash value generator software component 514 receives two inputs, a query 508 and a time dependent number 510. The time dependent number 510 is determined by a number generator software component 512 and can a random number, based upon a time stamp of a server device, or based upon a schedule. In some implementations, number generator 512 generates a new time dependent number 510 to replace an old time dependent number 510 at the expiration of a time interval.

In some implementations, the query 508 is provided to hash value generator 514 by a computing device. The hash value generator 514 converts the query into a number, if necessary and not inherent. Following conversion into a number, hash value generator 514 combines the query and the time dependent number and performs a hashing operation on the combined number. The hash function outputs a hash value 516 that is used by server identifier 518 to identify (i.e., select) a server to process query 508.

The selection of a server by server identifier 518 is relatively simple in some implementations. For example, where one-hundred back-end servers are available to process queries, hash value generator 514 can output a hash value 516 between 0 and 99. The server identifier may simply select a server that is located at an array location N, where N is the hash value. As an illustration corresponding to the hash table in FIG. 1, the query "Dinosaurs" is associated by hash value generator 514 with hash value "34." Hash value 34 corresponds, in a hash table, to "Server A." Server A not only processes "Dinosaurs" queries, but the thousands of queries that are also associated with hash value "34." The generation by hash value generator 514 of the same hash value for more than one input query is considered a collision (i.e., when multiple keys map to the same hash value). In this illustration, the system does not process the collisions in any particular manner.

In other implementations, system 500 handles the collisions so that each of the numerous queries mapped to a particular hash value are associated with unique records. Example mechanisms for performing the association include chaining; using overflow areas; or utilizing linear, quadratic, or random probing. Associating queries with unique records enables the transfer of a query to a different server independent of other queries processed by a particular server. For example, if a server is overloaded with numerous popular queries, server identifier 518 can modify the record corresponding to one of the popular queries so that the one query is processed by a different server (i.e., a server that has more availability). In some implementations, the range of hash values 516 output by hash value generator 514 significantly exceeds the number of servers.

Result identifier software module 520 identifies whether, for a particular query, a cached result 522 to the query is available or if the result must be computed by result processor software module 524. Result identifier 520 includes at least one processor 532 and interfaces with software modules on other computing devices using a communication interface 538. In some implementations, server 106 includes result identifier 520. In these implementations, result identifier 520 determines if caches 118 include information to respond to the query or if server 106 must access datastore 112 to compute the query.

If a cached result 522 is available for the particular query, cached result 522 is provided to result transmitter software module 526. If cached result 522 is not available, result processor 524 accesses a datastore and computes a response to the query. The computed response is provided to the result transmitter 526. For example, result processor 524 may access a datastore that includes an index to millions of websites and select the websites that are most relevant to the query. The result transmitter 526 routes the received information (i.e., the cached result or the computed response) to the machine originally submitting the query (not shown).

System 500 includes applications (e.g., software modules) and data 502, at least one operating system 504, and hardware/firmware 506. In some implementations, the applications and data 502 are associated with multiple operating systems 504 and hardware/firmware systems 506. For example, number generator 512 may be associated with a first operating system 504 and hardware/firmware system 506, while hash value generator 514 and result identifier 520 are associated with a second operating system 504 and hardware/firmware 506. Result identifier 520, result processor 524, and result transmitter 526 can be associated with a third operating system 504 and hardware/firmware system 506. Different associations between the applications and data 502 and multiple operating systems 504 and hardware/firmware systems 506 are possible. In various implementations, system 500 is representative of systems 100 or 200, or executes processes 300, 400, or variations thereof.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be realized as one or more computer programs, i.e., one or more modules of computer program instructions, encoded on a computer storage medium for execution by, or to control the operation of, data processing apparatus. The computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be realized in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for selecting a server from a plurality of servers to process a query, the method comprising:
    defining a length for a present time interval based upon an output of a first random number generator;
    defining a random seed for the present time interval based upon an output of a second random number generator;
    converting a query into a query number;
    performing a hashing operation on a combination of the query number and the random seed to generate a hash value associated with the query and the present time interval;
    selecting, based on the hash value, a server from a plurality of servers to process the query;
    sending the query to the selected server; and wherein the performing a hashing operation is performed by a processor; and
    re-defining the time interval length based upon another output of the first random number generator and re-defining the random seed based upon another output of the second random number generator upon an expiration of the present time interval.

2. The method of claim 1 wherein the selected server includes a cache of results responsive to the query, the cache created from an identical query previously received within the present time interval.

3. The method of claim 1 wherein the query conversion is from the alpha-numeric representation of the query to an underlying binary or hexadecimal numerical representation of the alpha numeric query.

4. The method of claim 1 wherein the selected server processes a plurality of queries and includes a cache of results for a subset of the plurality of queries, the subset of the plurality of queries determined based upon a popularity of queries in the subset.

5. A system for selecting a server from a plurality of servers to process a query, the system comprising:
    one or more servers; and
    a non-transitory computer-readable medium coupled to the one or more servers having instructions stored thereon which, when executed by the one or more servers, cause the one or more servers to perform operations comprising:
        defining a length for a present time interval based upon an output of a first random number generator;
        defining a random seed for the present time interval based upon an output of a second random number generator;
        converting a query into a query number;
        performing a hashing operation on a combination of the query number and the random seed to generate a hash value associated with the query and the present time interval;
        selecting, based on the hash value, a server from a plurality of servers to process the query;
        sending the query to the selected server; and
        re-defining the time interval length based upon another output of the first random number generator and re-defining the random seed based upon another output of the second random number generator upon an expiration of the present time interval.

6. The system of claim 5 wherein the selected server includes a cache of results responsive to the query, the cache created from an identical query previously received within the present time interval.

7. The system of claim 5 wherein the query conversion is from the alpha-numeric representation of the query to an underlying binary or hexadecimal numerical representation of the alpha numeric query.

8. The system of claim 5 wherein the selected server processes a plurality of queries and includes a cache of results for a subset of the plurality of queries, the subset of the plurality of queries determined based upon a popularity of queries in the subset.

* * * * *